United States Patent
Hoyhtya et al.

(10) Patent No.: US 11,129,137 B2
(45) Date of Patent: Sep. 21, 2021

(54) METHOD AND DEVICE FOR SELECTING ONE OR MORE RESOURCES FOR USE FROM AMONG A SET OF RESOURCES

(75) Inventors: Marko Hoyhtya, Oulu (FI); Heli Sarvanko, Oulu (FI); Johanna Vartiainen, Oulu (FI)

(73) Assignee: Teknologian tutkimuskeskus VTT Oy, Espoo (FI)

(*) Notice: Subject to any disclaimer, the term of this patent is extended or adjusted under 35 U.S.C. 154(b) by 747 days.

(21) Appl. No.: 13/703,057

(22) PCT Filed: Jun. 10, 2011

(86) PCT No.: PCT/FI2011/050547
§ 371 (c)(1),
(2), (4) Date: Feb. 1, 2013

(87) PCT Pub. No.: WO2011/154612
PCT Pub. Date: Dec. 15, 2011

(65) Prior Publication Data
US 2013/0203427 A1    Aug. 8, 2013

(30) Foreign Application Priority Data

Jun. 11, 2010 (FI) ..................... 20105665
Jun. 10, 2011 (WO) ................. PCT/FI2011/050547

(51) Int. Cl.
*H04W 72/02* (2009.01)
*H04W 16/14* (2009.01)
(Continued)

(52) U.S. Cl.
CPC .......... *H04W 72/02* (2013.01); *H04B 17/26* (2015.01); *H04W 16/10* (2013.01); *H04W 16/14* (2013.01); *H04W 72/06* (2013.01)

(58) Field of Classification Search
CPC ..... H04W 16/14; H04W 16/10; H04W 72/02; H04W 72/08; H04W 72/06;
(Continued)

(56) References Cited

U.S. PATENT DOCUMENTS

| 2009/0191906 A1* | 7/2009 | Abedi | H04W 16/14 455/501 |
| 2010/0075704 A1* | 3/2010 | McHenry | H04W 16/14 455/509 |

(Continued)

FOREIGN PATENT DOCUMENTS

| EP | 2083590 A2 | 7/2009 |
| EP | 2083594 A2 | 7/2009 |
| WO | WO 2009031825 A2 | 3/2009 |

OTHER PUBLICATIONS

PCT/FI2011/050547; International Search Report and Written Opinion; dated Oct. 3, 2011.
(Continued)

*Primary Examiner* — Yuwen Pan
*Assistant Examiner* — Umair Ahsan
(74) *Attorney, Agent, or Firm* — Merchant & Gould P.C.

(57) ABSTRACT

A method for selecting one or more resources for use from among a set of resources comprises obtaining (201) a first sub-set of the resources. The resources belonging to the first sub-set are the ones which have, according to occupancy information gathered over a long period of time, highest probabilities of matching requirements related to estimated usage time and/or needed capacity. The method further comprises selecting (202) a second sub-set from among the first sub-set of the resources on the basis of second occupancy information gathered over a short period of time. The resources belonging to the second sub-set are the ones from among the first sub-set which, according to the second information, have highest probabilities of matching require- (Continued)

ments related to estimated usage time and/or needed capacity. The subsequent use of the long and short term occupancy information increases the probability of optimal selection. The resources can be, for example, radio channels from which one radio channel is to be selected.

19 Claims, 3 Drawing Sheets

(51) Int. Cl.
*H04B 17/26* (2015.01)
*H04W 16/10* (2009.01)
*H04W 72/06* (2009.01)

(58) Field of Classification Search
CPC . H04W 72/082; H04W 72/085; H04W 36/06; H04L 27/0006
USPC ...... 455/423–425, 450–452.2, 454–455, 464
See application file for complete search history.

(56) References Cited

U.S. PATENT DOCUMENTS

| | | | | |
|---|---|---|---|---|
| 2010/0173586 | A1* | 7/2010 | McHenry et al. | 455/62 |
| 2010/0309317 | A1* | 12/2010 | Wu | H04W 16/14 348/180 |
| 2010/0309806 | A1* | 12/2010 | Wu | H04H 20/423 370/252 |
| 2012/0071189 | A1* | 3/2012 | Mody | H04L 27/0006 455/513 |

OTHER PUBLICATIONS

Choudhary S. et al. 'A fair cognitive Channel Allocation method for cellular networks', 2009 2nd International Workshop on Cognitive Radio and Advanced Spectrum Management, CogART 2009, Aalborg. Denmark, May 17-20, 2009, pp. 138-142, ISBN 978-1-4244-4582-0, doi: 10.1109/COGART.2009.5167249 abstract; section IV; Fig 1.
PCT/FI2011/050547; International Preliminary Report on Patentability; dated Dec. 14, 2012.
Chung S. et al. 'A cognitive MAC for VANET based on the Wave systems',; 11th International Conference on Advanced Communication Technology,; ICACT 2009, Phoenix Park, Korea, Feb. 15-18, 2009, pp. 41-46, ISBN 978-89-5519-138-7; abstract; sections 1 and 4.
Schäfer Ralf-Peter: HD Traffic, IQ Routes and Map Share—TomTOms latest technologies for premium navigation and traffic information, Jan. 1, 2008.
Search repor of the European application No. 11791993 issued by the European Patent Office dated Jun. 30, 2017.

* cited by examiner

METHOD AND DEVICE FOR SELECTING ONE OR MORE RESOURCES FOR USE FROM AMONG A SET OF RESOURCES

PRIORITY

This application is a national entry of PCT/FI2011/050547 filed on Jun. 10, 2011 which claims priority of FI20105665 filed on Jun. 11, 2010, both of which are fully incorporated herein by reference.

FIELD OF THE INVENTION

The invention relates generally to a method and a device for selecting one or more resources for use from among a set of resources. The set of resources can be, for example but not necessarily, a set of radio channels from which one or more radio channels is to be selected for data transmission. Furthermore, the invention relates to a computer program for selecting one or more resources for use from among a set of resources.

BACKGROUND

In many applications there is a need to select one or more resources for use from among a set of resources. For example, in automatic traffic management, advantageous routes are determined and communicated to road users so as to avoid and/or to mitigate congestions. In this example, roads represent the resources from among which the selection is to be made. Another example is a radio communication system utilizing dynamic spectrum allocation so that, at each time, radio channels which are currently free for use are sensed and selected for data transmission. In this example, the radio channels represent the resources from which the selection is to be made. Radio frequency spectrum bands are mostly allocated to licensed users but many bands are used only part of the time and/or locally. Future wireless systems will accommodate more and more users and high performance services, thus needing more radio frequency spectrum that is a scarce natural resource. Efficient use of the radio frequency spectrum will play a key role in the future. Therefore, cognitive radios have been proposed for lower priority secondary systems aiming at improving spectral efficiency by sensing the environment and then filling the discovered gaps of unused licensed spectrum by their own transmission. However, there are clear problems to be solved.

Spectrum sensing of all licensed radio channels decreases the throughput because it consumes a lot of time that could be used for data transfer. In addition, channel switching based on instantaneous occupancy information may result in poor operation since the selected channel might be heavily utilized by primary users even though it happened to be available during the sensing time. This can cause frequent service disruptions for secondary users, may result in interference to primary users, increases delays of transmission, and limits the capacity of the system. Commercial significance of the problem lay in the fact that the radio frequency spectrum is an expensive and limited resource. Thus, cognitive radios should be capable of finding available bands and using best ones for transmission without interfering with licensed systems.

Predictive models have been proposed for spectrum sharing in the prior art. P. A. K. Acharya, S. Singh, and H. Zheng "*Reliable open spectrum communications through proactive spectrum access, Proc. TAPAS*, August 2006" disclose a method based on the exponential weighted moving average for utilizing idle times in TV broadcast channels. Exponential ON-OFF traffic models and periodic-exponential models have been investigated by L. Yang, L. Cao, and H. Zheng "*Proactive channel access in dynamic spectrum networks, Proceedings of CrownCom*, August 2007". T. C. Clancy and B. D. Walker "*Predictive dynamic spectrum access*, SDR Forum conference, November 2006" present an analysis of predictability when primary traffic is assumed to be representable by a cyclostationary random process. Traffic prediction shown by Li and S. A. Zekavat "*Traffic pattern prediction and performance investigation for cognitive radio systems*, Proc. WCNC, pp. 894-899, March-April 2008" is performed using binomial distributed call arrival and gamma distributed call holding times. This method uses long term information in 24 hour periods in prediction. M. Höyhtyä, S. Pollin and A. Mämmelä "*Performance improvement with predictive channel selection for cognitive radios*, Proc.CogART, February 2008" propose a method that works with variety of traffic classes. The method classifies the traffic in different channels to deterministic and stochastic and uses specific prediction methods for different types of traffic to estimate what the following idle times in different channels will be. Publication WO/2009/031825 proposes the use of database and prediction for cognitive radios for exploiting idle periods of TV channels. These approaches have, however, a common problem of restricting the prediction to the certain traffic model only.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the first aspect of the invention there is provided a new method for selecting one or more resources for use from among a set of resources. The method comprises:
  obtaining a first sub-set of the set of resources, the resources belonging to the first sub-set being the ones from among the set of resources which have, according to first information gathered over a first period of time about occupancies of resources belonging to the set of resources, highest probabilities of matching requirements related to estimated usage time and/or needed capacity, and
  selecting a second sub-set from among the first sub-set of resources on the basis of second information gathered over a second period of time about the occupancies of the resources belonging to the first sub-set of resources,
  wherein the second period of time is shorter than the first period of time and the resources belonging to the second sub-set of resources are the ones from among the first sub-set of resources which, according to the second information, have highest probabilities of matching the requirements related to the estimated usage time and/or the needed capacity.

The method can be used, among others, in radio communication and in traffic management. In conjunction with the radio communication, the selecting the one or more resources for use from among the set of resources can be, for example, selecting one or more radio channels for data transmission from among a set of radio channels, where the set of radio channels represents the set of resources and the selected one or more radio channels represent the second sub-set of resources. In conjunction with the traffic management, the selecting the one or more resources for use from among the set of resources can be, for example, selecting one or more roads to be communicated to road users from among a set of roads, where the set of roads represents the set of resources and the selected one or more roads represent the second sub-set of resources.

In conjunction with the example related to the radio communication, the first information gathered over a longer period of time, i.e. long term information, may indicate long term statistical properties of the occupancies of the radio channels. The second information gathered over a shorter period of time, i.e. short term information, allows the final selection of the radio channel so that the most recent events are taken into account. The pre-selection on the basis of the first information increases the quality of the selection and makes the selection faster. This leads to intelligent radio channel selection and improves the performance both by increasing the throughput and also by reducing interference caused towards other radio communication systems.

In conjunction with the example related to the traffic management, the first information gathered over a longer period of time, i.e. the long term information, may indicate how the road traffic is usually distributed among roads and helps to guide parts of the traffic to roads that are not so heavily used to avoid congestions. The second information gathered over a shorter period of time, i.e. the short term information, is needed since for example accidents may change the situation and thus different guidance is needed.

In accordance with the second aspect of the invention there is provided a new device for selecting one or more resources for use from among a set of resources. The device comprises a processing circuitry arranged to:

obtain a first sub-set of the set of resources, the resources belonging to the first sub-set being the ones from among the set of resources which have, according to first information gathered over a first period of time about occupancies of resources belonging to the set of resources, highest probabilities of matching requirements related to estimated usage time and/or needed capacity, and select a second sub-set from among the first sub-set of resources on the basis of second information gathered over a second period of time about the occupancies of the resources belonging to the first sub-set of resources, wherein the second period of time is shorter than the first period of time and the resources belonging to the second sub-set of resources are the ones from among the first sub-set of resources which, according to the second information, have highest probabilities of matching the requirements related to the estimated usage time and/or the needed capacity.

In accordance with the third aspect of the invention there is provided a new system that comprises:

a first database storing first information gathered over a first period of time about occupancies of resources belonging to a set of resources, one or more processing circuitries, one of which being arranged to select a first sub-set of the set of resources on the basis of the first information, the resources belonging to the first sub-set being the ones from among the set of resources which have, according to the first information, highest probabilities of matching requirements related to estimated usage time and/or needed capacity, and a second database storing second information gathered over a second period of time about the occupancies of the resources belonging to the first sub-set of resources, the second period of time being shorter than the first period of time, wherein one of the one or more processing circuitries is arranged to select a second sub-set from among the first sub-set of resources on the basis of the second information, the resources belonging to the second sub-set of resources being the ones from among the first sub-set of resources which, according to the second information, have highest probabilities of matching the requirements related to the estimated usage time and/or the needed capacity.

In accordance with the fourth aspect of the invention there is provided a new computer program for selecting one or more resources for use from among a set of resources. The computer program comprises computer executable instructions for controlling a programmable processor to:

obtain a first sub-set of the set of resources, the resources belonging to the first sub-set being the ones from among the set of resources which have, according to first information gathered over a first period of time about occupancies of resources belonging to the set of resources, highest probabilities of matching requirements related to estimated usage time and/or needed capacity, and select a second sub-set from among the first sub-set of resources on the basis of second information gathered over a second period of time about the occupancies of the resources belonging to the first sub-set of resources, wherein the second period of time is shorter than the first period of time and the resources belonging to the second sub-set of resources are the ones from among the first sub-set of resources which, according to the second information, have highest probabilities of matching the requirements related to the estimated usage time and/or the needed capacity.

In accordance with the fifth aspect of the invention there is provided a new computer program product. The computer program product comprises a computer readable medium, e.g. a compact disc ("CD"), encoded with a computer program according to the invention.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that neither excludes nor requires the existence of also un-recited features. The features recited in depending claims are mutually freely combinable unless otherwise explicitly stated.

BRIEF DESCRIPTION OF THE FIGURES

The exemplifying embodiments of the invention and their advantages are explained in greater detail below with reference to the accompanying drawings, in which.

DESCRIPTION OF THE EXEMPLIFYING EMBODIMENTS

Figure 1:
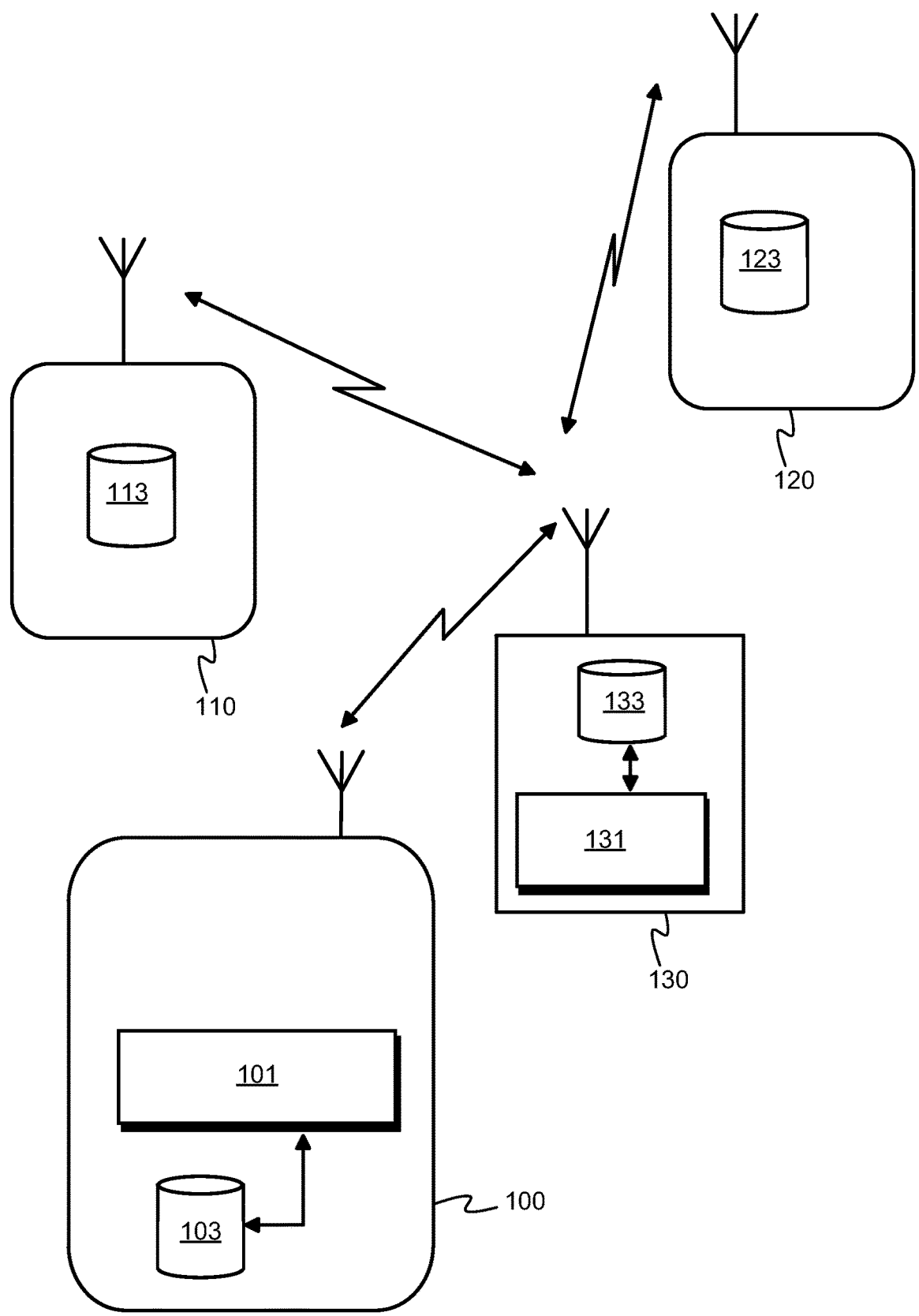
FIG. 1 shows a schematic illustration of a system according to an embodiment of the invention.

FIG. 1 shows a schematic illustration of an exemplifying system according to an embodiment of the invention. The system comprises radio communication devices 100, 110, and 120 and a server device 130. This exemplifying system is assumed to be a lower priority secondary system which utilizes temporarily or permanently unused portions of the radio frequency spectrum that is reserved for a higher priority primary system. The higher priority primary system is not shown in FIG. 1. The system shown in FIG. 1 improves the overall spectral efficiency, because it utilizes the portions of the radio frequency spectrum which otherwise would be unused. The radio communication devices 100, 110, and 120 are cognitive radios ("CR") arranged to sense the environment and use the discovered unused portions of the radio frequency spectrum for their own transmission. The radio communication devices 100, 110, and 120 are arranged to use history information about occupancies of radio channels for sensing free radio channels that represent unused portions of the radio frequency spectrum. The history information comprises first information gathered over a first period of time about occupancies of the radio channels and second information gathered over a second period of time about the occupancies of the radio channels. The first period of time can be, for example, days or weeks and the second period of time can be, for example, seconds or minutes.

In the exemplifying system shown in FIG. 1, the first information is stored in a long term database 133 located in the server device 130. The radio communication devices 100, 110, and 120 have their own short term databases 103, 113, and 123 for storing the second information. The long term database can aid and speed up the sensing process by prioritizing the radio channels so that only most auspicious ones will be sensed by the radio communication devices. Thus the time needed for sensing the free radio channels is reduced. The long term database can include information on wide range of radio channels. The long term database can, for example, include information about activities over different radio channels over a long time period, e.g. a week. When a radio channel is needed, the long term database can be used to check out which of the radio channels are the most auspicious radio channels are at that time, e.g. on Monday at 2 o'clock. The short term database gives more detailed information over the radio channels of interest. The information about local radio channel use is gathered by periodical sensing and stored to the short term database. As mentioned above, every radio communication device 100, 110, and 120 has its own short term database. Without limiting the generality, we can consider only the operation of the radio communication device 100 and of the server device 130. Using pattern recognition and classification techniques, the radio communication device 100 can recognize and classify traffic patterns in different radio channels. This allows the system to use specific prediction methods for different types of traffic to make idle time prediction of radio channels as accurate as possible. Radio channels with longest idle times are preferably selected for operation.

In this exemplifying case, the selection of the radio channel is carried out in the following way:
1) Pre-selection of N out of M radio channels using the long term database, where N<M.
2) Final selection of P out of N radio channels using the short term database and sensing, where 1<P<N Thus, three different timescales are used in the operation: (i) long term, (ii) short term and (iii) instantaneous. Long term database includes the first information which is collected, e.g. over a day or a week. Short term database includes the second information that covers the channel use e.g. over few seconds or minutes, depending on the traffic carried at the radio channels. The sensing of the radio channels gives instantaneous information about instantaneous channel use. Sensing can be performed cooperatively between many radio communication devices. Sensing information stored in the short term database can be just own sensing results or cooperative sensing data.

In the system shown in FIG. 1, the server device 130 includes the long term database. However, the long term database can be included e.g. in a base station or even exist separately. The long term database includes information from the radio channels of interest over a long term. Physically the long term database is preferably local to its users since otherwise it may be challenging to offer relevant information. The long term database can be shared with several radio communication devices located near each other, for example, in a campus area or in a company. Only the spectrum use spatially close to requesting radio communication devices is important to know to assist the operation of them. Channel information can be gathered to the long term database with various approaches, including spectrum sensing and obtaining the spectrum knowledge through beacons or control channels or by sharing databases with licensed users. The long term database can also include policy database, which includes information about different quality of service ("QoS") parameters for the radio channels to be used in the radio channel selection, e.g. interference levels and parameters for different higher priority systems. The long term database is preferably immobile to offer relevant information over its serving area.

The radio communication device 100 has a wireless interface to the long term database 133 to change information with it. When the radio communication device 100 wants to access a radio channel to send its data, it first connects to the long term database to ask what the most auspicious radio channels are. The server device 130 sends back N radio channels to be sensed. The server device comprises a processing circuitry 131 arranged to select the N radio channels on the basis of the long term database. In addition to frequency information such as center frequency and bandwidth of the channel, the request and feedback can include information about how long channels are needed/predicted to be available. Thus, if the radio communication device 100 does not need spectrum for a long time, such channels can be offered to those users requesting longer times. The radio communication device 100 senses the given radio channels periodically, stores this information to its short term database 103, and uses information from both sources in the radio channel selection before transmitting data. Periodically, the radio communication device 100 stops transmission to perform sensing to check the availability of the radio channels, selects the radio channel and continues transmission until all the needed data is sent. The radio communication device 100 comprises a processing circuitry 101 arranged to control and/or carry out the above-mentioned actions. The processing circuitry 101 can comprise one or more programmable processors and/or one or more dedicated hardware processors.

The above described system is an example of a system that comprises:
- a first database, e.g. the long term database 133, storing first information gathered over a first period of time about occupancies of resources belonging to a set of resources, e.g. a set of radio channels or roads,
- one of the one or more processing circuitries, one of which, e.g. the processing circuitry 131, is arranged to select a first sub-set of the set of resources on the basis of the first information, the resources belonging to the first sub-set being the ones from among the set of resources which have, according to the first information, highest probabilities of matching requirements related to estimated usage time and/or needed capacity, and
- a second database, e.g. the short term database 103, storing second information gathered over a second period of time about the occupancies of the resources belonging to the first sub-set of resources, the second period of time being shorter than the first period of time, wherein one of the one or more processing circuitries, e.g. the processing circuitry 101, is arranged to select a second sub-set from among the first sub-set of resources on the basis of the second information, the resources belonging to the second sub-set of resources being the ones from among the first sub-set of resources which, according to the second information, have highest probabilities of matching the requirements related to the estimated usage time and/or the needed capacity.

Figure 2:
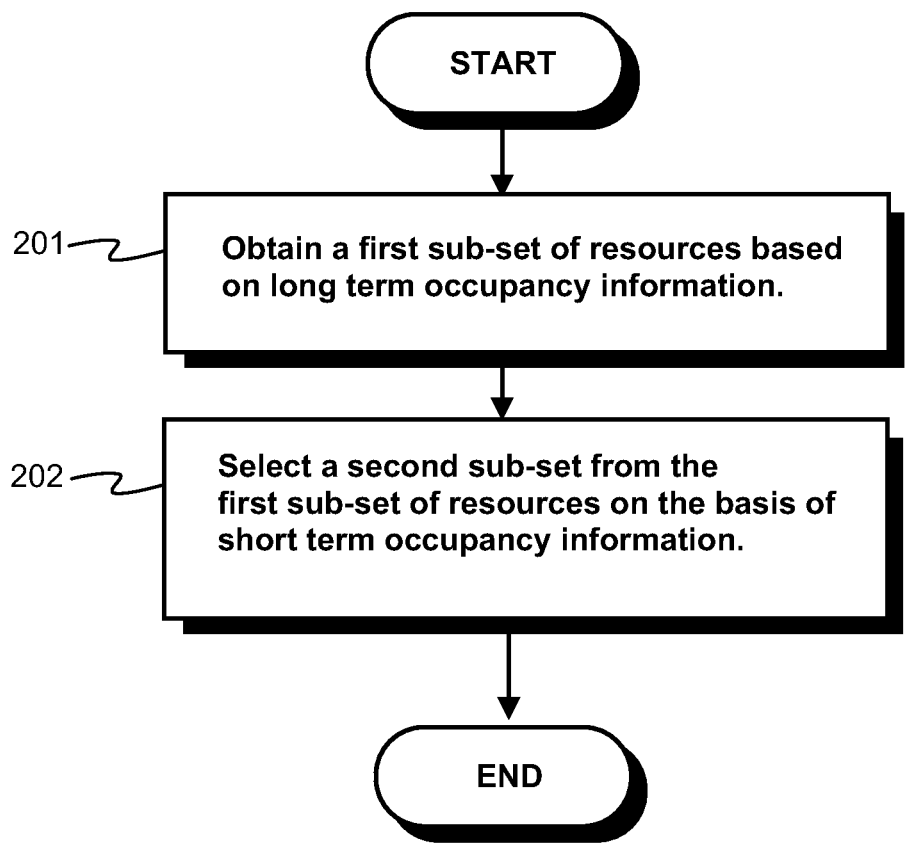
FIG. 2 shows a high-level flow chart of a method according to an embodiment of the invention for selecting one or more resources for use from among a set of resources.

FIG. 2 shows a high-level flow chart of a method according to an embodiment of the invention for selecting one or more resources for use from among a set of resources. The method comprises:
- obtaining, in the phase 201, a first sub-set of the set of resources, the resources belonging to the first sub-set being the ones from among the set of resources which have, according to first information gathered over a first period of time about occupancies of resources belonging to the set of resources, highest probabilities of matching requirements related to estimated usage time and/or needed capacity, and
- selecting, in the phase 202, a second sub-set from among the first sub-set of resources on the basis of second information gathered over a second period of time about the occupancies of the resources belonging to the first sub-set of resources, wherein the second period of time is shorter than the first period of time and the resources belonging to the second sub-set are the ones from among the first sub-set of resources which, according to the second information, have highest probabilities of matching the requirements related to the estimated usage time and/or the needed capacity.

In a method according to an embodiment of the invention, the selecting the second sub-set of resources is selecting one or more radio channels for data transmission from among a set of radio channels. In this case, the set of radio channels represents the set of resources and the selected one or more radio channels represent the second sub-set of resources.

In a method according to another embodiment of the invention, the selecting the second sub-set of resources is selecting or more roads to be communicated to road users from among a set of roads. In this case, the set of roads represents the set of resources and the selected one or more roads represent the second sub-set of resources.

Figure 3:
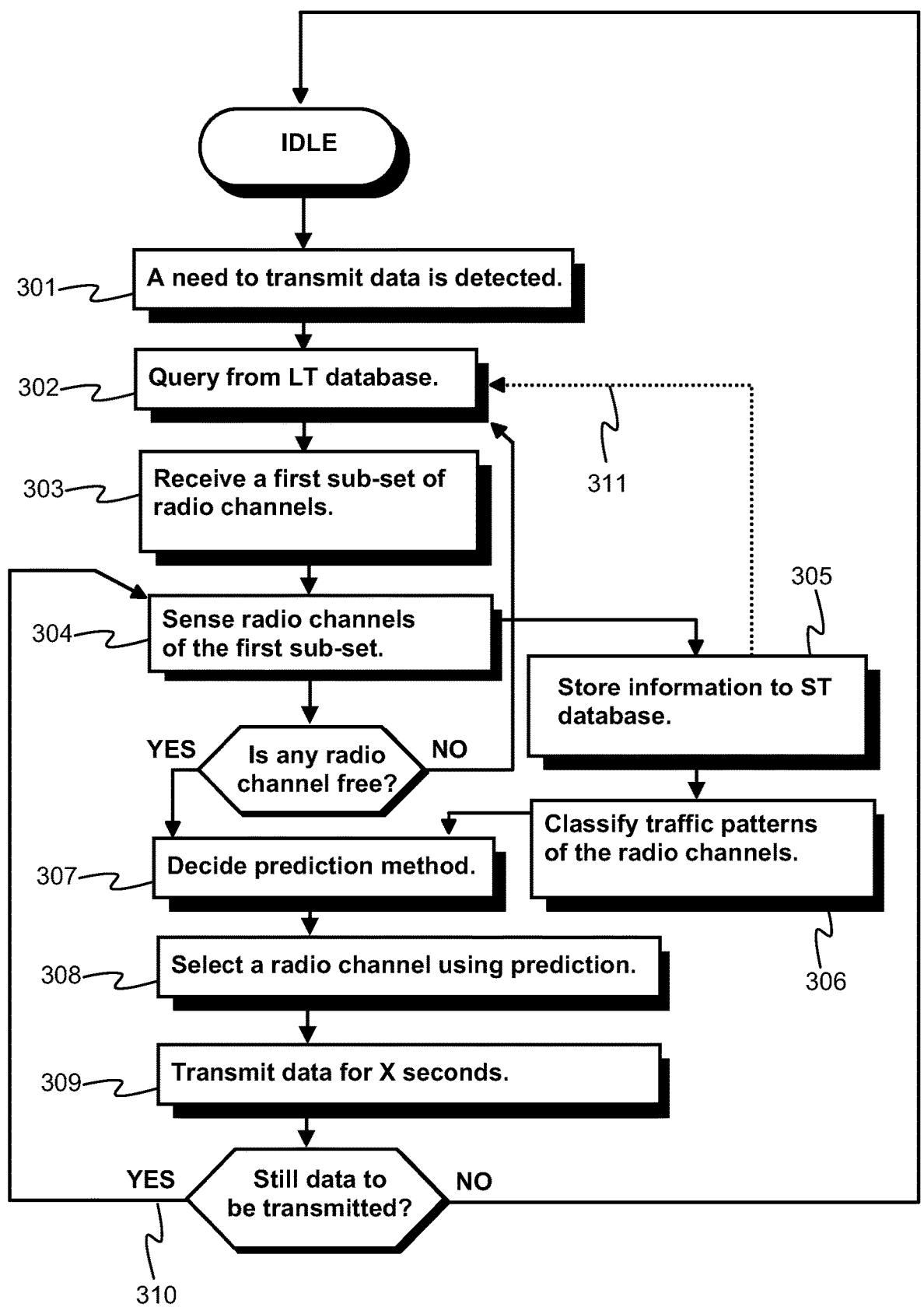
FIG. 3 shows a flow chart of a method according to an embodiment of the invention for selecting a radio channel.

FIG. 3 shows a flow chart of a method according to an embodiment of the invention for selecting a radio channel for data transmission.

The phase 301: A need for the data transmission is detected.

The phase 302: A radio communication device is controlled to send a query to a server device to get a first sub-set of radio channels from the long term ("LT") database. The first sub-set represents radio channels which are most suitable and auspicious in light of the first information in the long term database. The query can be aimed to obtain only information about available channels or it can also include some additional information, e.g. estimated time for the total data transmission or needed capacity so that the server device can respond on the basis of the additional information.

The phase 303: The first sub-set of radio channels is received from the server device. For example, time and capacity estimations can be used to define radio channels that are wide enough and/or offer needed time for transmission.

The phase 304: The radio channels of the first sub-set are sensed to know whether or not they are free at the moment.

The phase 305: The sensing information of the radio channels of the first sub-set is stored into the short term database ("ST") to be used in predictive radio channel selection. Dashed line 311 means that there is an option that the short term database base can give feedback to the long term database especially when the given radio channels of the first sub-set are not good for use. The radio frequency use at the same area can change time to time and thus, the long term database may need to be updated.

The phase 306: After a learning period the short term database contains enough history information, i.e. the second information, about the radio channels of the first sub-set to enable analysis and classification of traffic patterns of these radio channels. Prediction of future idle times depends on the pattern of the traffic. Thus, the classification of the traffic patterns enables the use of a specific prediction method for any specific type of the traffic, making the prediction more accurate. The radio communication device is controlled to classify the traffic patterns of the radio channels of the first sub-set.

The phase 307: The radio communication device decides the prediction method based on the classification.

The phase 308: Future idle times of the radio channels of the first sub-set are predicted taking into account the classification result and history data in the short term database, and the radio channel estimated to offer the longest idle time is selected.

The phase 309: After the radio channel selection has been done, the radio communication device sends data for a pre-determined time period, X seconds, in the selected radio channel. The parameter X is the maximum tolerable interference time for a higher priority primary system. If there is still data to be sent, the "YES"-branch 310, the radio communication device senses again the radio channels of the first sub-set and continues transmission on an available radio channel. The parameter X is a system dependent parameter that is preferably known by the higher priority primary systems operating on same frequency band as the radio communication device in question. Value for the parameter could be stored in the long term database and given to the requesting radio communication device simultaneously with other information of the first sub-set of radio channels.

A method according to another embodiment of the invention for selecting a radio channel for data transmission comprises:
controlling a radio communication device to send a query to a server device to get the first information, i.e. the long term information, from the server device as a response to a need for the data transmission,
selecting a first sub-set of radio channels from among the set of radio channels on the basis of the first information,
controlling the radio communication device to sense free radio channels from among the first sub-set, and
selecting one radio channel for the data transmission from among the free radio channels on the basis of the second information, i.e. the short term information.

In this case, the selection of the first sub-set of radio channels from among the set of all radio channels takes place in the radio communication device instead of the server device. The purpose of this example is to show that the present invention is not limited to a case in which the selection of the first sub-set of radio channels takes place in the server device.

In a method according to an embodiment of the invention, the second information, i.e. the short term information, indicates a measured degree of occupancy of each radio channel belonging to the first sub-set of radio channels, and the one having the lowest measured degree of occupancy is selected from among the first sub-set of radio channels for the data transmission.

In a method according to an embodiment of the invention, the second information, i.e. the short term information, indicates statistical properties of use of each radio channel belonging to the first sub-set of radio channels, and the one which has the lowest probability of being used during a coming pre-determined time period is selected from among the first sub-set of radio channels for the data transmission.

A computer program according to an embodiment of the invention comprises software modules for selecting one or more resources for use from among a set of resources. The software modules can be, for example, subroutines and/or functions and they comprise computer executable instructions for controlling a programmable processor to:
obtain a first sub-set of the set of resources, the resources belonging to the first sub-set being the ones from among the set of resources which have, according to first information gathered over a first period of time about occupancies of resources belonging to the set of resources, highest probabilities of matching requirements related to estimated usage time and/or needed capacity, and
select a second sub-set from among the first sub-set of resources on the basis of second information gathered over a second period of time about the occupancies of the resources belonging to the first sub-set of resources,
wherein the second period of time is shorter than the first period of time and the resources belonging to the second sub-set of resources are the ones from among the first sub-set of resources which, according to the second information, have highest probabilities of matching the requirements related to the estimated usage time and/or the needed capacity.

In computer program according to an embodiment of the invention, the computer executable instructions for controlling the programmable processor to select the second sub-set are computer executable instructions for controlling the programmable processor to select one or more radio channels for data transmission from among a set of radio channels, the set of radio channels representing the set of resources and the selected one or more radio channels representing the second sub-set of resources.

A computer program product according to an embodiment of the invention comprises a computer readable medium, e.g. a compact disc ("CD"), encoded with a computer program according to an embodiment of invention.

A signal according to an embodiment of the invention is encoded to carry information defining a computer program according to an embodiment of invention.

The specific examples provided in the description given above should not be construed as limiting. Therefore, the invention is not limited merely to the embodiments described above, many variants being possible.

What is claimed is:

1. A device for selecting one or more resources for use from among a set of resources, the device comprising:
a processing circuitry arranged to retrieve, from an external long-term database, first information representing long-term information about occupancies of the resources belonging to the set of resources, the first information being gathered to the external long-term database over a first period of time, wherein:
the processing circuitry is arranged to obtain a first sub-set of resources selected from the set of resources on the basis of the first information, the resources belonging to the first sub-set being ones from among the set of resources which have, according to the first information, highest probabilities of matching requirements related to one or more of an estimated usage time and a needed capacity,
the processing circuitry is arranged to retrieve, from an internal short-term database, second information about occupancies of the resources belonging to the first sub-set of resources, the second information being gathered to the internal short-term database over a second period of time having a non-zero temporal duration and being shorter than the first period of time, and
the processing circuitry is arranged to select a second sub-set of resources from among the first sub-set of resources on the basis of the second information, the resources belonging to the second sub-set of resources being the ones from among the first sub-set of resources which, according to the second information, have highest probabilities of matching the requirements related to one or more of the estimated usage time and the needed capacity, and
wherein:
the device further comprises a sensing circuitry for sensing whether each resource belonging to the second sub-set is free for use on the moment of sensing, and
the processing circuitry is arranged to select the one or more resources for the use from among the free resources of the second subset.

2. The device according to claim 1, wherein the device is a radio communication device and the processing circuitry is arranged to select one or more radio channels for data transmission from among a set of radio channels, the set of radio channels representing the set of resources and the selected one or more radio channels representing the second sub-set of resources.

3. The device according to claim 2, wherein the processing circuitry is arranged to control the radio communication device to send a query to a server device to get a first sub-set of radio channels from the server device as a response to a need for the data transmission, the first sub-set of radio channels representing the first sub-set of resources, and to sense free radio channels from among the first sub-set, and the processing circuitry is arranged to select one radio channel for the data transmission from among the free radio channels on the basis of the second information.

4. The device according to claim 2, wherein the processing circuitry is arranged to control the radio communication device to send a query to a server device to get the first information from the server device as a response to a need for the data transmission, the processing circuitry is arranged to select a first sub-set of radio channels from among the set of radio channels on the basis of the first information, the first sub-set of radio channels representing the first sub-set of resources, the processing circuitry is arranged to control the radio communication device to sense free radio channels from among the first sub-set, and the processing circuitry is arranged to select one radio channel for the data transmission from among the free radio channels on the basis of the second information.

5. The device according to claim 3, wherein the second information is arranged to indicate a measured degree of occupancy of each radio channel belonging to the first sub-set of radio channels, and the processing circuitry is arranged to select the one having the lowest measured degree of occupancy from among the first sub-set of radio channels.

6. The device according to claim 3, wherein the second information is arranged to indicate statistical properties of use of each radio channel belonging to the first sub-set of radio channels, and the processing circuitry is arranged to select the one, from among the first sub-set of radio channels, which has the lowest probability of being used during a coming pre-determined time period.

7. The device according to claim 3, wherein the processing circuitry is arranged to update the second information with information obtained by the sensing the free radio channels.

8. The device according to claim 3, wherein the processing circuitry is arranged to control the radio communication device to transmit data for a pre-determined time period after selection of the one radio channel for the data transmission, and the processing circuitry is arranged to re-perform the sensing of the free radio channels and the selection of the one radio channel for the data transmission after the pre-determined time period as a response to a situation in which there is still the need for the data transmission.

9. A method for selecting one or more resources for use from among a set of resources, the method comprising:
retrieving, from an external long-term database, first information representing long-term information about occupancies of the resources belonging to the set of resources, the first information being gathered to the external long-term database over a first period of time,
obtaining a first sub-set of resources selected from the set of resources on the basis of the first information, the resources belonging to the first sub-set being ones from among the set of resources which have, according to the first information, highest probabilities of matching requirements related to one or more of an estimated usage time and a needed capacity,
retrieving, from an internal short-term database, second information about occupancies of the resources belonging to the first sub-set of resources, the second information being gathered to the internal short-term database over a second period of time having a non-zero temporal duration and being shorter than the first period of time,
selecting a second sub-set of resources from among the first sub-set of resources on the basis of the second information, the resources belonging to the second sub-set of resources being ones from among the first sub-set of resources which, according to the second information, have highest probabilities of matching the requirements related to one or more of the estimated usage time and the needed capacity,
sensing whether each resource belonging to the second sub-set is free for use on the moment of sensing, and
selecting the one or more resources for the use from among the free resources of the second subset.

10. The method according to claim 9, wherein the selecting the second sub-set of resources is selecting one or more radio channels for data transmission from among a set of radio channels, the set of radio channels representing the set of resources and the selected one or more radio channels representing the second sub-set of resources.

11. The method according to claim 10, wherein the method comprises:
controlling a radio communication device to send a query to a server device to get a first sub-set of radio channels from the server device as a response to a need for the data transmission, the first sub-set of radio channels representing the first sub-set of resources,
controlling the radio communication device to sense free radio channels from among the first sub-set, and
selecting one radio channel for the data transmission from among the free radio channels on the basis of the second information.

12. The method according to claim 10, wherein the method comprises:
controlling a radio communication device to send a query to a server device to get the first information from the server device as a response to a need for the data transmission,
selecting a first sub-set of radio channels from among the set of radio channels on the basis of the first information, the first sub-set of radio channels representing the first sub-set of resources,
controlling the radio communication device to sense free radio channels from among the first sub-set, and
selecting one radio channel for the data transmission from among the free radio channels on the basis of the second information.

13. A method according to claim 11, wherein the second information indicates a measured degree of occupancy of each radio channel belonging to the first sub-set of radio channels, and the one having the lowest measured degree of occupancy is selected from among the first sub-set of radio channels for the data transmission.

14. A method according to claim 11, wherein the second information indicates statistical properties of use of each radio channel belonging to the first sub-set of radio channels, and the one which has the lowest probability of being used during a coming pre-determined time period is selected from among the first sub-set of radio channels for the data transmission.

15. A method according to claim 11, wherein the second information is updated with information obtained by the sensing the free radio channels.

16. A method according to claim 11, wherein the method comprises:

controlling the radio communication device to transmit data for a pre-determined time period after the selection of the one radio channel for the data transmission, and re-performing the sensing of the free radio channels and the selection of the one radio channel for the data transmission after the pre-determined time period as a response to a situation in which there is still the need for the data transmission.

17. A non-volatile computer readable medium encoded with a computer program for selecting one or more resources for use from among a set of resources, the computer program comprising computer executable instructions for controlling a programmable processor to:
 retrieve, from an external long-term database, first information representing long-term information about occupancies of the resources belonging to the set of resources, the first information being gathered to the external long-term database over a first period of time,
 obtain a first sub-set of resources selected from the set of resources on the basis of the first information, the resources belonging to the first sub-set being ones from among the set of resources which have, according to the first information, highest probabilities of matching requirements related to one or more of an estimated usage time and a needed capacity,
 retrieve, from an internal short-term database, second information about occupancies of the resources belonging to the first sub-set of resources, the second information being gathered to the internal short-term database over a second period of time having a non-zero temporal duration and being shorter than the first period of time,
 select a second sub-set of resources from among the first sub-set of resources on the basis of the second information, the resources belonging to the second sub-set of resources being ones from among the first sub-set of resources which, according to the second information, have highest probabilities of matching the requirements related to one or more of the estimated usage time and the needed capacity,
 retrieve, from a sensor circuitry, information indicative whether each resource belonging to the second sub-set is free for use on the moment of sensing, and
 select the one or more resources for the use from among the free resources of the second subset.

18. The non-volatile computer readable medium according to claim 17, wherein the computer executable instructions for controlling the programmable processor to select the second sub-set are computer executable instructions for controlling the programmable processor to select one or more radio channels for data transmission from among a set of radio channels, the set of radio channels representing the set of resources and the selected one or more radio channels representing the second sub-set of resources.

19. A system comprising:
 a long-term database storing first information representing long-term information about occupancies of resources belonging to a set of resources, the first information being gathered to the long-term database over a first period of time,
 a short-term database storing second information about the occupancies of the resources belonging to the set of resources, the second information being gathered to the short-term database over a second period of time having a non-zero temporal duration and being shorter than the first period of time,
 a sensor circuitry for producing information indicative whether each resource belonging to the set of resources is free for use on the moment of sensing, and
 one or more processing circuitries,
 wherein one of the one or more processing circuitries is arranged to:
  retrieve, from the long-term database, the first information,
  obtain a first sub-set of resources selected from the set of resources on the basis of the first information, the resources belonging to the first sub-set being ones from among the set of resources which have, according to the first information, highest probabilities of matching requirements related to one or more of an estimated usage time and a needed capacity,
  retrieve, from the short-term database, the second information about occupancies of the resources belonging to the first sub-set of resources,
  select a second sub-set of resources from among the first sub-set of resources on the basis of the second information, the resources belonging to the second sub-set of resources being ones from among the first sub-set of resources which, according to the second information, have highest probabilities of matching the requirements related to one or more of the estimated usage time and the needed capacity,
  retrieve, from the sensor circuitry, information indicative whether each resource belonging to the second sub-set is free for use on the moment of sensing, and
  select the one or more resources for the use from among the free resources of the second subset.

\* \* \* \* \*